Sept. 14, 1948.                J. F. IWICK                2,449,483
                    ANIMATED PICTURE VIEWING APPARATUS
Filed June 18, 1947                                2 Sheets—Sheet 1

INVENTOR.
John F. Iwick
BY
Attorney

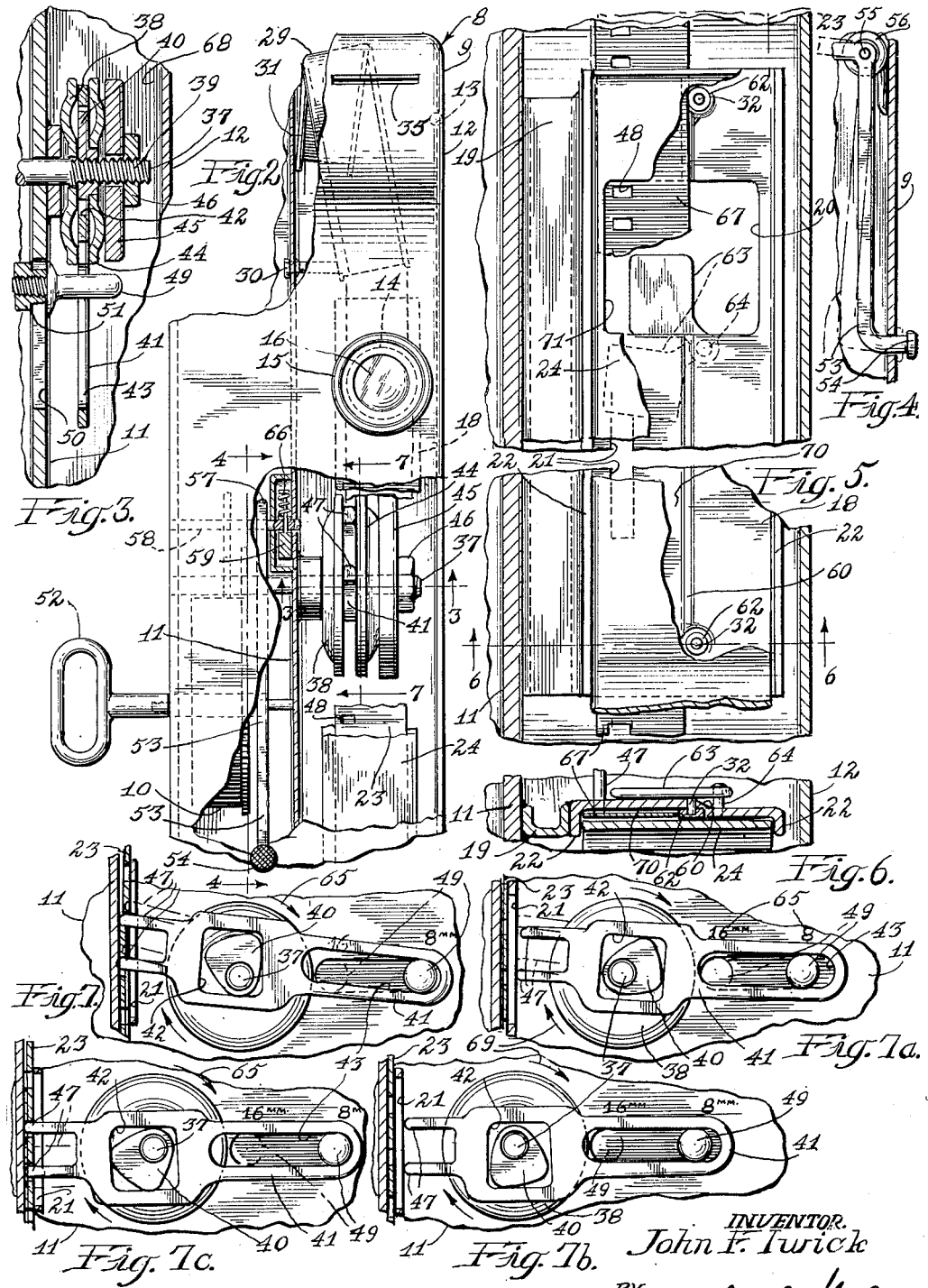

Patented Sept. 14, 1948

2,449,483

UNITED STATES PATENT OFFICE 2,449,483

ANIMATED PICTURE VIEWING APPARATUS

John F. Iwick, Chicago, Ill.

Application June 18, 1947, Serial No. 755,369

4 Claims. (Cl. 88—17)

My invention relates to motion picture or animated film viewing devices.

An object of my invention is to provide an automatic motion picture film viewer by means of which lengths of motion picture film may be viewed by holding the adjustable lens of the said viewer to the eye and looking in the direction of a source of light, and by pressing the control button.

A further object of my invention is to provide a film viewer having a motor operated cam which, by a continuous forward, upward, backward and downward rotary motion, will cause its claw to move a length of motion picture film through a guide rack by means of the slots in the side of the said motion picture film.

A further object of my invention is to provide a film viewer, having a film guide rack which may be quickly adapted to either 8 mm. or 16 mm. film by adjusting the cam means and by proper adjustment of the viewing aperture.

A still further object of my invention is to provide a film viewer by means of which short lengths of endless film may be viewed continuously or, by means of slots formed in the case of the film viewer, entire reels of film may be viewed by passing the free end of the film through the said slots in the case.

A still further object of my invention is to provide, in a film viewer, a control device which, together with a governor, will cause the film to pass the eye piece in a continuous and regulated sequence of views which will simulate motion pictures.

A still further object of my invention is to provide a prime mover which, when operated by the aforementioned control device and cam actuated claw, will cause motion picture film to move continuously through a guide rack.

A still further object of my invention is to provide, in a film viewer, a guide rack that is adapted to either 8 mm. or 16 mm. film.

A still further object of my invention is to provide film deflector means adapted to maintain endless bands of film in angularly offset relationship, with the optical axis passing through the eye piece, the viewing aperture and the light window.

Other objects and advantages inherent in my invention will become readily apparent from an ensuing description and the accompanying drawings, in which like parts are designated by like numerals, and in which:

Fig. 2 represents a portion of the side view of my invention with parts cut away to show the control and cam action mechanism.

Fig. 3 represents a cross-sectional view taken substantially on line 3—3 of Fig. 2.

Fig. 4 represents a cross-sectional view taken substantially on line 4—4 of Fig. 2.

Fig. 5 represents a side view of my invention with parts cut away to show a modification of the guide rack to accommodate either the 8 mm. or 16 mm. film.

Fig. 6 represents a cross-sectional view taken substantially on line 6—6 of Fig. 5.

Fig. 7 represents a fragmentary view looking in the direction of arrows 7—7 of Fig. 2.

Figure 1:
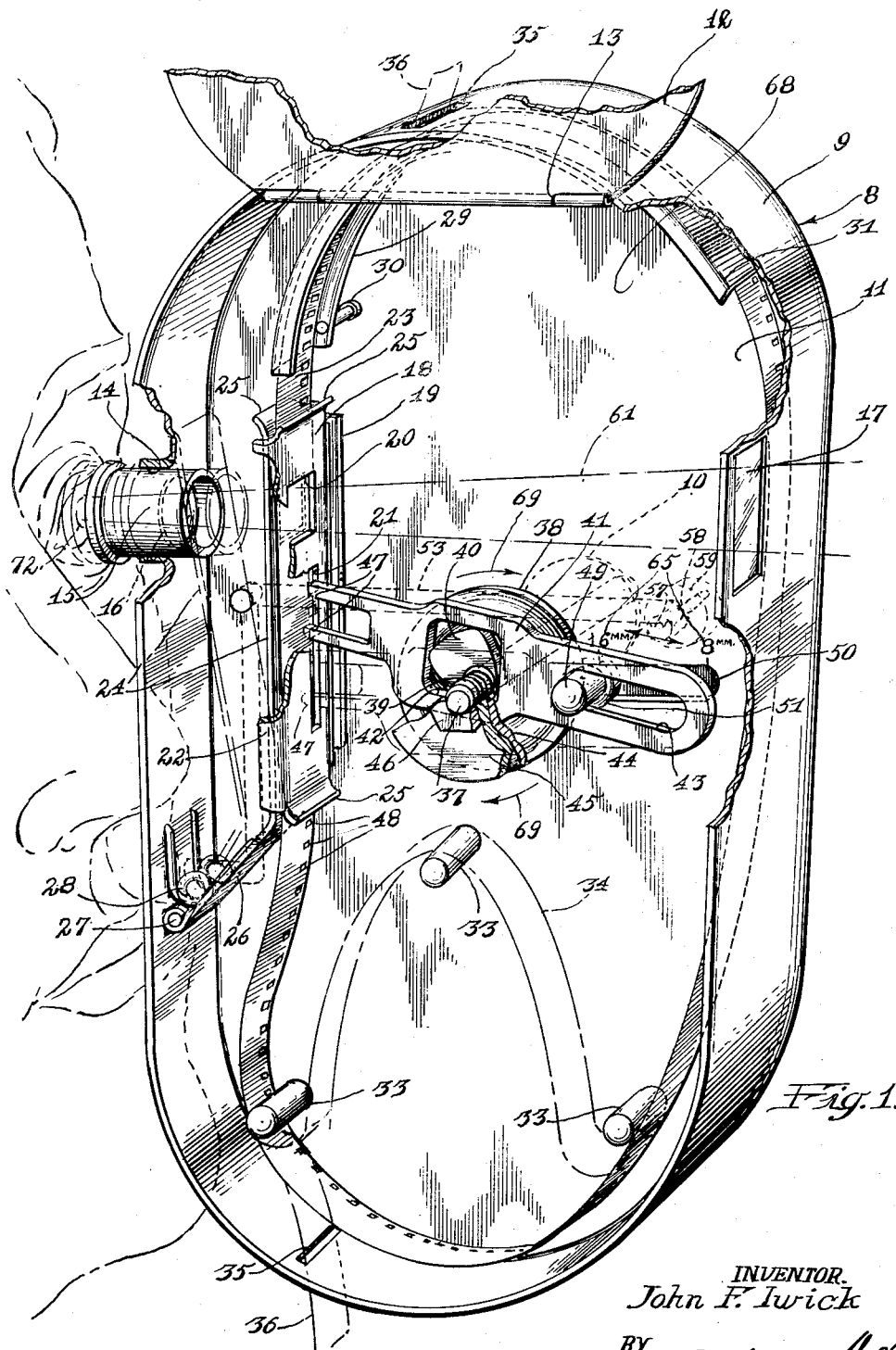
Fig. 1 represents a perspective view of my invention with parts cut away and with the cover open to expose the working and film containing part of my invention.

Figs. 7a, 7b, and 7c represent the cycle of operation of the claw mechanism at 90° intervals.

My invention is generally designated 8. A streamlined casing 9 holds the prime mover 10, which is encased in a housing 11. A cover 12 is hinged at 13 and opened out to expose the interior 68 of the film viewer in which is contained the film rack and moving parts, and providing accessibility for interchanging of film. A drawn out opening 14 in the upper side holds, by frictional adjustment, an eye piece 15 in which is inserted a lens 16. Opposite the eye piece 15, in the other side of the case and on a horizontal level, is a window 17 for admitting the necessary illumination required to view the transparent film. A channel bracket 18 is attached by means of channel 19 to the sides of the housing 11, being attached vertically and in such a position that an aperture 20 is aligned with the eye piece 15 and the window 17 intermediately therebetween and in proper focal relationship.

On the inner side and lower half of the bracket 18 is formed a narrow slot 21 in which the tips 47 of the claw 41 moves. The sides 22 of the channel bracket 18 acts as a guide to the film 23. The film 23 being held in the bed of the bracket 18 by a retainer plate 24, the bottom end 26 of which is bent toward the inner side of the case 9 and hinged thereto at 27. A coiled wire spring 28 keeps the plate 24 in contact with the film 23. The top end of the plate 24 and the bracket 18 are formed out at 25 to form a throat to permit a free movement of the film 23.

In the interior 68 of the case 9, a deflector guide rail 29 is attached by means of the fastening 30. The end 31 of the deflector guide rail 29 is warped inwardly toward the housing 11 and acts to guide the film 23 so that it will not interfere with light entering through the window 17. A number of pegs 33 are attached to the face of the housing 11 in the lower part of the case 9 and acts as guides to the film 23 to prevent it from becoming tangled as it rotates. The pegs 33 are so located on the housing 11 to accommodate different lengths of endless film, as shown by the dotted line 34.

Two slots 35 are formed in the case 9; one at the top, and one at the bottom, as shown in Fig. 1, in order that any length of film may be viewed by the viewer 8 merely by inserting the end of the film 36 through the slot 35 and intermediately therebetween through the guide bracket 18, the film guide lateral deflector 29 may be removed for this purpose. A spindle 37 is attached to the prime mover 10 and extends through the housing case 11 into the space 68 of the case 9. Riding on the spindle 37 is a washer 38 and a cam 40 is screwed onto the threaded part 39 of the said spindle 37.

A square cutout 42 in the claw 41 rides upon the cam 40 and is held in place by a second washer 44, upon which a balancing lug 45 is held by lock nut 46. In an extended portion of the claw 40 is formed a slot 43 which pivots movably upon a fulcrum 49. The fulcrum 49 is set into a slot 50 in the face of the casing 11 and held adjustably therein by a shoulder nut 51; the other end of the claw 41 is formed into claw points 47 of a size to permit their entry in the slots 48 on the edge of the film 23. The spindle 37, together with the cam 40, rotates in a clockwise direction, as shown by arrows 69 and, in rotating, the cam 40, riding in the square cutout 42 of the claw 41 and pivoted on the fulcrum 49, will impart to the claw 41 and to its claw tips 47, four distinct motions, illustrated in Figs. 7, 7a, 7b, and 7c.

Fig. 7 shows the tip 47 within the film slot 48 and at the top of the stroke.

Fig. 7a illustrates the removal or backward action of the said tip 47, and

Fig. 7b shows the rear downward stroke of the claws 41 with the tip ready to enter again into the slot 48.

Fig. 7c shows the tip again within the slot 48 of the film 23 and beginning the upward movement of the said film 23, to complete the cycle of operation.

The movement just described is caused by the rotating of the cam 40 within the square cutout 42 of the claw 41, and the up and down length of the stroke of the tips 47 of the said claw is determined by the setting of the fulcrum 49 in its slot 50 upon which the claw 41 slidably articulates. Markings 65 of 8 mm. and 16 mm. on the surface of the casing 11 and adjacent to predetermined points in the slot 50 indicates the proper setting for the fulcrum 49 for 8 mm. and 16 mm. motion picture film. A slight modification of the film rack, as shown in Fig. 5, shows how the said film rack may be adapted to guide either an 8 mm. motion picture film, or a 16 mm. motion picture film.

An offset 60, in the guide bracket 18, provides a groove or bed 70 wide enough to accommodate 8 mm. motion picture film. A pair of rollers 62, revolving on pins 32, set one at the top and one at the bottom of the bracket 18, may be provided. The rollers 62 would serve to prevent the 8 mm. film from binding or slipping out of its groove 70 while in motion. A square flap 63 is pivoted to the bracket 18 at 64 and, when in an up position, as shown in full lines in Fig. 5, serves to regulate the size of the opening 20, so that only one exposure of the 8 mm. film may be viewed. The apertures 20 of the bracket 18 and 71 of the retaining plate 24 are of a size to accommodate the regular 16 mm. film exposures, and the said apertures are congruent and in registered superimposition. When 16 mm. film is being viewed, the flap 63 may be turned to a down position, as shown by the dotted lines in Fig. 5.

Since the slot 48 in the 16 mm. film 23 and the 8 mm. film 67 are of the same size and in the same position on the edge of the film, the only other adjustment required to permit the claw tip 47 to move the 8 mm. film 67, or the 16 mm. film 23, the desired running exposure per revolution is an adjustment of the fulcrum 49 in its slot 50, as previously described.

The prime mover 10 in the case illustrated, as shown in Fig. 2, consists of a clockwork mechanism which may be wound or charged by a key 52, which may be removed when not in use.

An action control means is provided and consists of a lever 53, having a knurled end 54 bent to protrude from the sides of the case 9. The lever 53 is bent at right angles to form a bellcrank and pivoted at 55 to the inside of the housing 11, and its other end 57 bears with a braking action against the shaft 58. The lever 53 is held in its braking action against shaft 58 by a spring 56 at its pivot point 55. Since the shaft 58 is geared to the prime mover 10, as shown by dotted lines in Fig. 2, therefore pressure upon the button 54 will release and allow the prime mover to cause the cam mechanism to rotate and to move the film. Release of pressure on button 54 causes the brake 57 to stop the action of the prime mover by frictional engagement.

A governor 59, with a spring regulator 66, provides a regulating adjustment to the speed of the prime mover 10; hence, to the speed of the movement of the film through the viewer.

To use the film viewer, the cover 12 of the case 9 is opened and a length of film 23 is placed between the bed of the guide bracket 18 and the retaining plate 24 by swinging the guide plate 24 backward, as shown in dotted lines, Fig. 1, sufficiently to allow the film to be placed within the bed of the rack 18; the upper half of the film being placed in the film guide lateral deflector 29, and the lower half being draped about the guide pegs 33. After closing the cover 12, the eye piece 15 is held to one of the eyes 72 of the observer, the eye piece 15 may be adjusted to get the correct focus, as shown by dotted lines in Fig. 1.

Also shown in Fig. 1, by the dotted light 61, is the path of the light as it penetrates through the window 17, through the openings 20 and 71 and through the film 23 to the eye 72 by means of the eye piece 15. Pressure upon the button 54 will, by means of the prime mover 10 and the cam mechanism, cause the film to move past the eye piece 15 in a movement that will simulate motion pictures.

It is apparent that I have invented a novel animated picture viewing device, of compact economical construction. It will, of course, be understood that various changes may be resorted to in the form, details, arrangement and proportions of the various parts without departing from the scope of the present invention which, generally stated, consists in the matter illustrated and described and set forth in the appended claims.

Having thus described and disclosed my in- vention, what I claim as novel and desire to secure by Letters Patent is:

1. An animated picture viewing device comprising, a case, a prime mover mounted in the said case and provided with a driving shaft extending therefrom, cam means secured to the said driving shaft, claw feed means mounted in the said case and connected to the said cam means, an eye piece mounted on one side of the said case, illuminating window means provided on the opposite side of the said case in axial alignment with the said eye piece, film guide means articulately secured to the said case and intermediately disposed to the said eye piece and the said window means, and idler roller means mounted at the base of and within the confines of the said case constructed and arranged to accommodate endless lengths of film of greater magnitude than the perimetral magnitude of the said case.

2. An animated picture viewing device comprising, a case, a prime mover mounted in the said case and provided with a driving shaft extending therefrom, cam means secured to the said driving shaft, claw feed means mounted in the said case and connected to the said cam means, an eye piece mounted on one side of the said case, illuminating window means provided on the opposite side of the said case in axial alignment with the said eye piece, film guide means articulately secured to the said case and intermediately disposed to the said eye piece and the said window means, film deflector means mounted above the said film guide means adapted to divert the rear portion of a film operating therein in offset relationship to an imaginary geometric plane determined by the axis passing through the said eye piece and window means and the longitudinal axis of the said film guide means, and idler roller means mounted at the base and within the confines of the said case constructed and arranged to accommodate endless lengths of film of greater magnitude than the perimetral magnitude of the said case.

3. An animated picture viewing device comprising, a case, a prime mover mounted in the said case and provided with a driving shaft extending therefrom, cam means secured to the said driving shaft, claw feed means mounted in the said case and connected to the said cam means, an eye piece mounted on one side of the said case, illuminating window means provided on the opposite side of the said case in axial alignment with the said eye piece, and film guide means articulately secured to the said case and intermediately disposed to the said eye piece and the said window means, the said film guide means being provided with an offset channel portion of lesser width than the width of the said film guide means, a pair of film guide rollers mounted on the said off-set channel, the said film guide means being provided with viewing aperture means, and articulate shutter means constructed and arranged to optionally be superimposed to cover a fractional portion of the area of the said aperture means.

4. An animated picture viewing device comprising, a case, a prime mover mounted in the said case and provided with a driving shaft extending therefrom, cam means secured to the said driving shaft, claw feed means mounted in the said case and connected to the said cam means, an eye piece mounted on one side of the said case, illuminating window means provided on the opposite side of the said case in axial alignment with the said eye piece, film guide means articulately secured to the said case and intermediately disposed to the said eye piece and the said window means, and film deflector means mounted above the said film guide means adapted to divert the rear portion of a film operating therein in offset relationship to an imaginary geometric plane determined by the axis passing through the said eye piece and window means and the longitudinal axis of the said film guide means, the said film guide means being provided with an offset channel portion of lesser width than the width of the said film guide means, a pair of film guide rollers mounted on the said offset channel, the said film guide means being provided with viewing aperture means, and articulate shutter means constructed and arranged to optionally be superimposed to cover a fractional portion of the area of the said aperture means.

JOHN F. IWICK.

REFERENCES CITED

The following references are of record in the file of this patent:

UNITED STATES PATENTS

| Number | Name | Date |
| --- | --- | --- |
| 1,350,374 | Michalek | Aug. 20, 1920 |
| 1,991,394 | Klein | Feb. 19, 1935 |
| 1,997,642 | Klein | Apr. 16, 1935 |
| 2,122,804 | Tichenor | July 5, 1938 |
| 2,311,204 | Bouma | Feb. 16, 1943 |
| 2,408,384 | Farrell | Oct. 1, 1946 |
| 2,432,200 | Lasky et al. | Dec. 9, 1947 |

FOREIGN PATENTS

| Number | Country | Date |
| --- | --- | --- |
| 304,603 | Great Britain | Nov. 7, 1929 |